(12) United States Patent
Scorcioni

(10) Patent No.: US 9,148,768 B2
(45) Date of Patent: Sep. 29, 2015

(54) COMMUNICATION SYSTEM HAVING AUTOMATED FILTERING BASED ON MENTAL STATE DECISIONS

(71) Applicant: Ruggero Scorcioni, San Diego, CA (US)

(72) Inventor: Ruggero Scorcioni, San Diego, CA (US)

(*) Notice: Subject to any disclaimer, the term of this patent is extended or adjusted under 35 U.S.C. 154(b) by 68 days.

(21) Appl. No.: 14/159,418

(22) Filed: Jan. 20, 2014

(65) Prior Publication Data

US 2014/0206323 A1  Jul. 24, 2014

Related U.S. Application Data

(60) Provisional application No. 61/754,523, filed on Jan. 18, 2013.

(51) Int. Cl.
| | |
|---|---|
| H04W 4/16 | (2009.01) |
| H04M 1/60 | (2006.01) |
| H04M 1/725 | (2006.01) |
| H04M 1/66 | (2006.01) |

(52) U.S. Cl.
CPC .............. *H04W 4/16* (2013.01); *H04M 1/6066* (2013.01); *H04M 1/72577* (2013.01); *H04M 1/66* (2013.01)

(58) Field of Classification Search
None
See application file for complete search history.

(56) References Cited

U.S. PATENT DOCUMENTS

| | | | | |
|---|---|---|---|---|
| 6,847,892 | B2 * | 1/2005 | Zhou et al. | 701/408 |
| 8,041,344 | B1 * | 10/2011 | Coughlan et al. | 455/414.1 |
| 8,755,782 | B2 * | 6/2014 | Lim et al. | 455/418 |
| 2012/0052905 | A1 * | 3/2012 | Lim et al. | 455/550.1 |
| 2013/0078963 | A1 * | 3/2013 | Prasad et al. | 455/414.1 |
| 2013/0217441 | A1 * | 8/2013 | Kitatani et al. | 455/556.1 |
| 2015/0045007 | A1 * | 2/2015 | Cash | 455/418 |

* cited by examiner

*Primary Examiner* — Ashish K Thomas
(74) *Attorney, Agent, or Firm* — Gary L. Eastman, Esq.

(57) ABSTRACT

A communication device having automated filtering based on mental state decisions of the present invention includes a brainwave sensing device that has sensors positioned on a user which can wirelessly communicate the mental state(s) of the user through a signal conditioner to portable electronic device. Subsequently, when the portable electronic device receives signals from a communication system, such as a call or a message, the calls or messages can be either be allowed or interrupted and stored depending on the mental state of the user. Thus, by using the mental state of the user, the portable electronic device can control the communication between the device and a telephone or message system to prevent interruptions during periods of intense focus, for example. In addition, this application provides methods for operating the communication device having automated filtering based on mental state decisions of the present invention.

10 Claims, 6 Drawing Sheets

COMMUNICATION SYSTEM HAVING AUTOMATED FILTERING BASED ON MENTAL STATE DECISIONS

RELATED APPLICATION

This application claims the benefit of priority to U.S. Provisional Patent Application Ser. No. 61/754,523, entitled "Communication System Having Automated Filtering Based on Mental State Decisions" filed on Jan. 18, 2013, currently co-pending, and fully incorporated herein by this reference.

FIELD OF THE INVENTION

The present invention relates generally to devices used to measure physiological conditions, including mental states, and control operation of devices in response thereto. The present invention is more particularly, though not exclusively, useful as a mental state predictor for control of personal electronics and telecommunications products to improve the efficiency of the user.

BACKGROUND OF THE INVENTION

The popularity of personal electronic devices has grown exponentially over the past decades. While these mobile devices are bringing great changes to our life, not all of these changes are positive. For instance, on the positive side, personal electronics are portable, low power, and provide days of continuous without recharge use such that people are always connected. Indeed, these portable electronic devices provide constant text and telephonic communication with others, provides instant access to the internet, and interfaces with other global electronic networks such as Global Positioning Satellites (GPS) to ensure nobody loses their way. If a user needs to find information about locations, companies, restaurants, news, or radio, the user can get instant access through search systems and the Internet.

One of the negative aspects of the popularity of personal electronic devices is that those devices are constantly present. No longer is there a period of silence or calm as phone calls, text messages, electronic mail (email) messages bombard the user constantly.

The result of this constant bombardment from electronic devices is the growing problem of device-induced attention deficit disorder (DIADD). While this disorder may not be clinically defined quite yet, it nevertheless is understood to refer to the commonplace occurrence of a person's inability to focus for any period of time due to the constant interruption of electronic devices. Indeed, even the most focused individuals find it difficult to concentrate closely when his or her cell phone is constantly beeping, ringing, or buzzing.

The tendency to be drawn to the various electronic devices to make a call, send a text message, review a message, or to service the many requests that constantly appear results in the user becoming increasingly distracted, irritable, impulsive, restless and, over the long term, underachieving. Simply put, the ever-present stimulus from personal electronic devices reduces a person's concentration, and ultimately their efficiency.

Symptoms of DIADD include a person failing to reach their full potential. When a person realizes that they could be producing more but in fact they're producing less, or when they know they're smarter than their work product reflects, and when a person answers questions in obtuse ways that are superficial, then it is likely that they are suffering from DIADD.

Another manifestation of DIADD is the inability to carry a thought from start through to conclusion. Often when a thought process is interrupted, even for the briefest moment, it may require many minutes to regain that focus, and in some cases, those thoughts are lost forever.

Another downside to the ever-available portable electronic device is the lack of a period of reflection when making or responding to calls or messages. For instance, when a person is upset, frustrated, or angry, it is often very tempting to grab the portable electronic device and send an ill-reasoned message. Historically, a person would have a period of time to consider on the message or call while going to the telephone. However, these days the personal electronic device is no further than the user's pocket, which can result in a poorly thought-out message or call being made while the user remains upset, frustrated, or angry.

It is also problematic for users of electronic devices to remember to turn off the device prior to engaging in activities requiring heightened levels of attention and thought. It is too tempting to check email, update social networking sites, such as Facebook, and search the Internet for the latest thought on the user's mind.

In light of the above, it would be advantageous to provide a device which senses the current mental state of the user and provides feedback to the user regarding that mental state. It would be further advantageous to provide a device which senses the user's mental state and interrupts the creation and transmission of calls or messages while in an undesirable, or predetermined, mental state. It would be further advantageous to provide a device for implementation in high-stress environments which monitors a user's mental state, and then alert the telecommunication system and others of the mental state, and automatically reassign or redirect tasks until the user returns to a more desirable mental state. This would be particularly advantageous when soldiers, firefighters, airplane pilots, police officers, and medical doctors are under high stress as failure to concentrate can result in deadly mistakes.

SUMMARY OF THE INVENTION

The Communication System Having Automated Filtering Based on Mental State Decisions of the present invention includes an electroencephalograph (EEG) headset in communication with a mobile electronic device. The EEG headset and mobile electronic device cooperate to determine the mental state of the wearer of the headset, and based on this determination, control the communication between the mobile electronic device and a communication system, such as a cellular telephone system.

The EEG headset integrates one or more EEG sensors to couple electrical signals from the wearer's brain for sensing and sampling in accordance with EEG signal detection methods. The output from the sensing and sampling is used to determine the brain wave patterns which operate together with other sensing input to detect user motion and body properties (like skin temperature, skin conductance, GPS, accelerometer, gyroscopes, magnetometer) can provide an indication of the mental state of the wearer. By using the mental state of the wearer, the mobile electronic device can control the communication between the device and a telephone or message system to prevent interruptions during periods of intense focus, for example.

The present invention also provides a system that allows for the interruption of both incoming and outgoing phone calls and messages and any data communication (such as emails, Facebook® updates, etc) based on the mental state of the user. For instance, the wearer may be prevented from receiving calls or messages during periods of intense focus, or may be prevented from originating calls or messages during periods of intense anger or aggression.

In an alternative embodiment of the present invention, the EEG headset may be integrated into a fixed station telephone system, such as a call center, and utilized to monitor the mental state of the telephone operations on duty. Using this embodiment, the call traffic, or nature of the calls, may be adjusted depending on the mental state of the call handler. For instance, if a call handler becomes excited or upset during a call center call, the call center may direct subsequent calls having a lower level of stress or challenge to provide the call handler the opportunity to recover from the temporary mental state of excitement or upset. The present invention provides for the call center management of incoming call based on an employee's mental state such that an employee that is not relaxed would receive an easier support call.

BRIEF DESCRIPTION OF THE DRAWING

The nature, objects, and advantages of the Communication System Having Automated Filtering Based on Mental State Decisions of the present invention will become more apparent to those skilled in the art after considering the following detailed description in connection with the accompanying drawings, in which like reference numerals designate like parts throughout, and wherein.

DETAILED DESCRIPTION OF A PREFERRED EMBODIMENT

Figure 1:
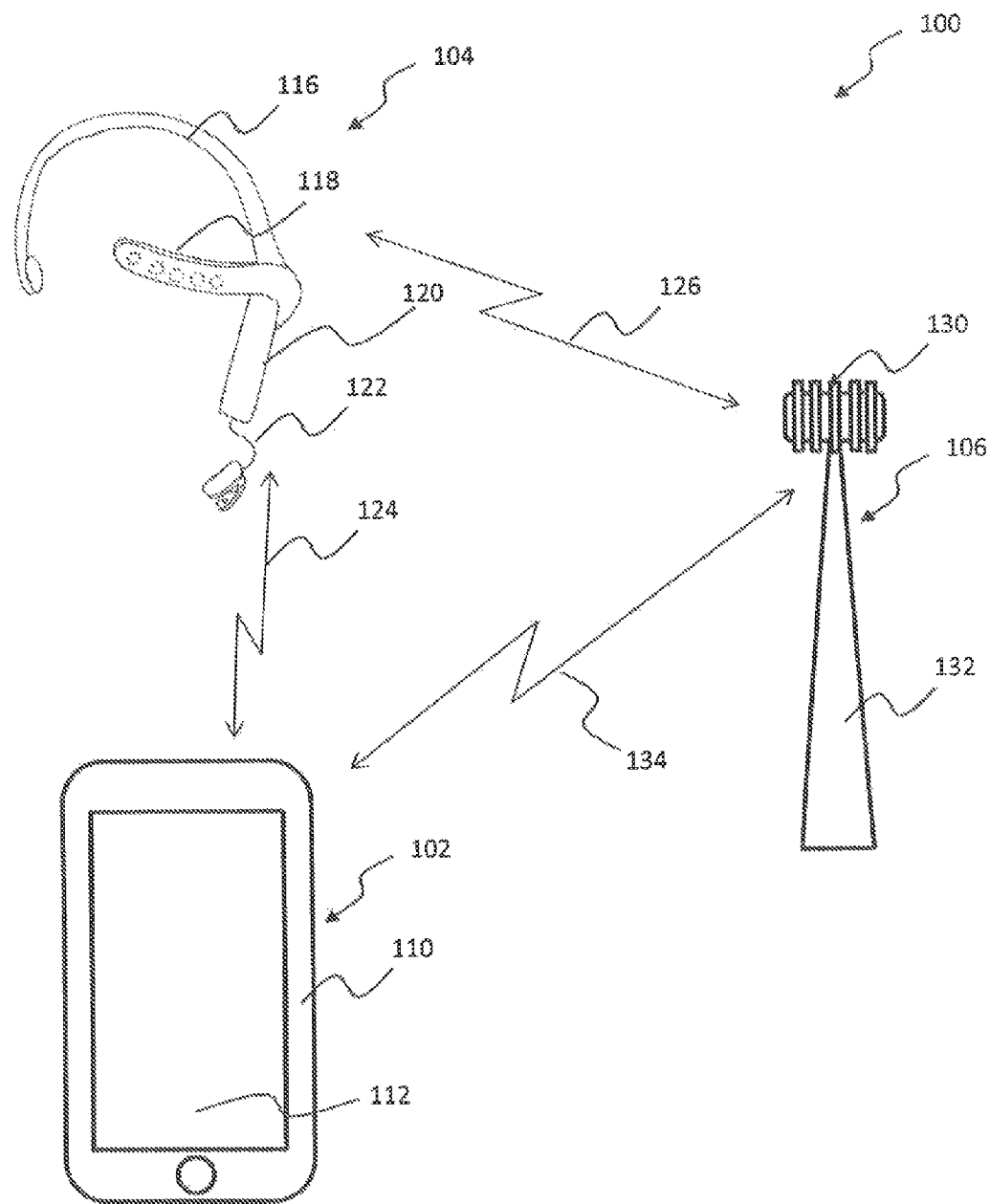
FIG. 1 is a system level block diagram of the Communication System Having Automated Filtering Based on Mental State Decisions of the present invention showing a brainwave sensing device in communication with a portable electronic device, such as a cell phone, which is in further communication with a telecommunication system, such as a cellular telephone system.

Referring initially to FIG. 1, a system level block diagram of the Communication System Having Automated Filtering Based on Mental State Decisions of the present invention is shown and generally designated 100. Device 100 includes a brainwave sensing device, such as an electroencephalograph (EEG) headset 104 in communication with a portable electronic device 102, such as a cell phone, which is in further communication with a telecommunication system 106, such as a cellular telephone system.

EEG headset 104 includes a headband 116 which supports a brain sensor 118 having one or more EEG sensors capable of perceiving the electrical characteristics of the brain within the skull. These perceived EEG signals are passed through a signal conditioner 120 which when grounded to a user, such as with earlobe clip 122, provides EEG signals which can be communicated over a channel, such as a local wireless link 124 to mobile electronic device 102. Mobile electronic device 102 then, through user interface 112, operates phone 110 to send or receive messages or calls from communication system 106. Specifically, when EEG headset 104 returns signals which indicate a particular mental state to mobile electronic device 102, the communication channel 134 between antennas 130 on tower 132 can be interrupted or allowed to mobile electronic device 102. Alternatively, EEG headset 104 may communicate directly with antenna 130 on tower 132 to provide device-independent communication with communication system 106.

Figure 2:
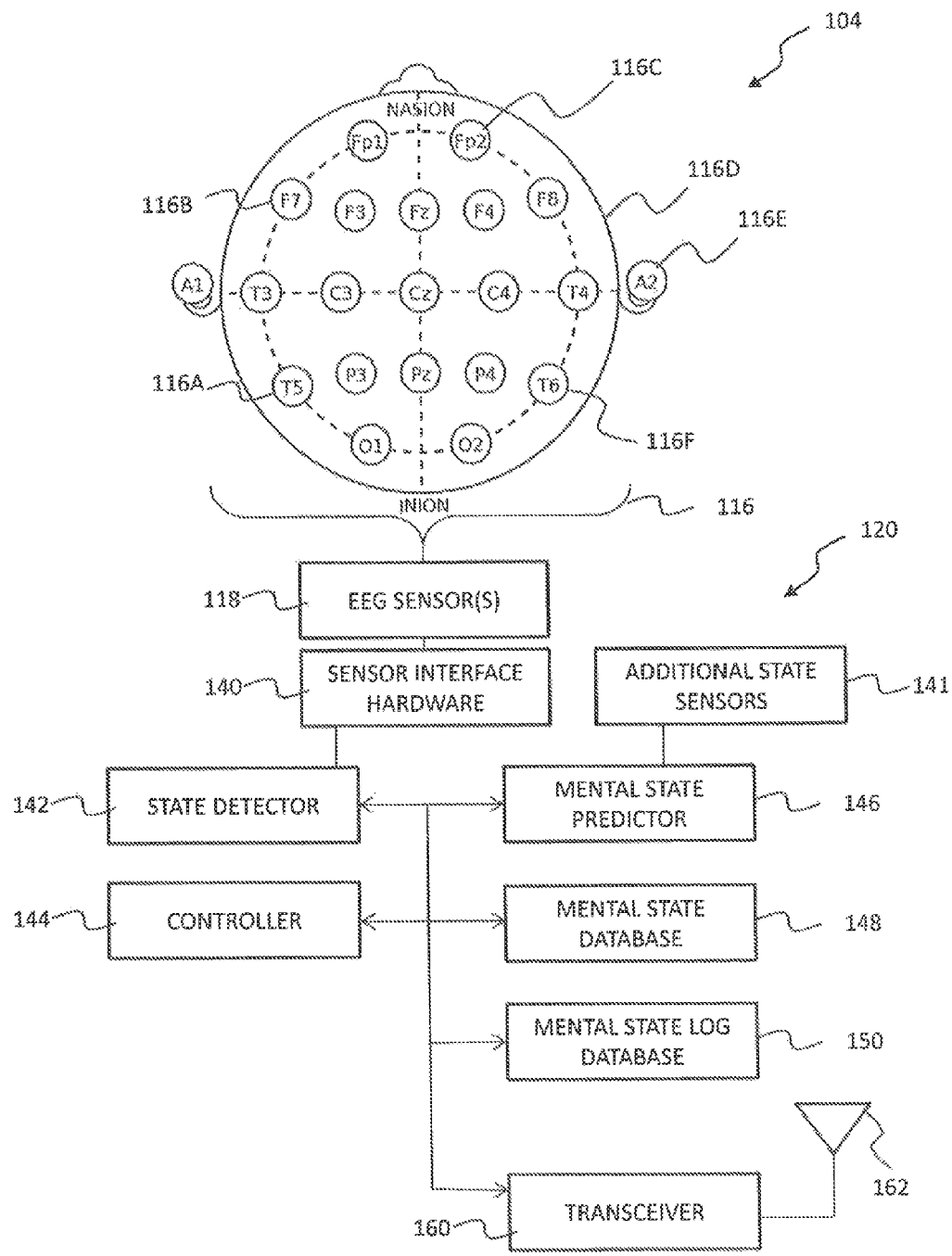
FIG. 2 is a block diagram of the Communication System Having Automated Filtering Based on Mental State Decisions of the present invention showing an exemplary skull with representative EEG sensor locations, and one or more EEG sensors in electrical connection to the sensor interface hardware which feeds signals to a state detector which, in combination with a controller and mental state database and mental state predictor, a mental state is determined and stored in a mental state log database and to a transceiver for transmission to a communication system.

Referring now to FIG. 2, a more detailed block diagram of the EEG headset of the Communication System Having Automated Filtering Based on Mental State Decisions of the present invention is shown and generally designated 104. EEG headset 104 is shown in conjunction with an exemplary skull 116 with representative EEG sensor locations 116A-F. It is to be appreciated that one or more brain sensors 118 (also shown in FIG. 1) are in electrical connection to the sensor interface hardware 140 which feeds signals to a state detector 142. In use, brain sensors 118 may be of any type know in the art which perceive the electrical conditions within the skull of a wearer and provide signals corresponding to these electrical conditions to a sensor interface hardware 140 which may filter, amplify, and condition the signals for further processing.

State detector 142 receives signals from sensor interface hardware 140 and provides this state detector information to controller 144. The controller can then, with possible use of additional state sensor 141, access mental state predictor 146 to predict the mental state or states which the wearer may be experiencing, such as 70% focused, 25% relaxed, etc. The controller 144 may also access mental state database 148 to determine the particular user's mental state or states, and then logs this condition in mental state log database 150.

The mental states that are perceived and determined may then be communicated using transceiver 160 through antenna 162 to other devices, such as a communication system 106 (shown in FIG. 1), or to a mobile electronic device 102.

The Communication System Having Automated Filtering Based on Mental State Decisions of the present invention incorporates mental state sensors and technologies generally known in the art. In a preferred embodiment, and to collect and sense information coming from the brain, electroencephalograph (EEG), magneto encephalography (MEG), electrocorticography (ECoG), magnetic resonance imaging (MRI), and near-infrared spectroscopy (NIR) may be used. In a preferred embodiment, brain sensors 118 are EEG sensors as they are most widely researched, miniaturized, and a cost-effective solution for detecting brain activity at this time.

Electroencephalography detects voltage potentials on the scalp. The research into EEG pattern recognition and neural oscillations derives data directly from the changes in electrical potentials which result from the neurons firing inside the brain. Neurons send signals by way of creating an electrical potential across the neural membranes, which continues in certain amplitudes and patterns until it reaches its final destination. The signals themselves, or remnants of the signals can be detected as far outside the brain as the scalp. The various technologies for detection listed above vary in the type of signal remnants and the invasiveness of the detector. An brain sensor 118 sits on the outside of the head, and retrieves data by way of a conductor which can read voltage changes that cross the detector or rise to the surface of the skin. The range of these signals are anywhere in the 0-100 microvolt ($\mu V$) range.

Electroencephalograph sensor technology can be "wet" or "dry". In a preferred embodiment of the present invention, the sensor technology itself has a variety of forms, but vary in the metal used to pick up the signal as well as whether a liquid conductor is or is not used as an interface between the sensor and the skin. Metals like tin, silver, silver-silver chloride, and gold are used. And various conductive fluids like, conductive gels or saline solution are used as interfaces. For EEG connections that require an interface, they are referred to as "wet" and for EEG unit which do not require an interface liquid they are referred to as "dry." A limited study comparing the data integrity of dry to wet EEG showed there was no appreciable difference from peak amplitude or latency values between the two types of connections.

Data collection requires a comparison point or baseline to compensate for artifacts. The voltage changes are detected by several means and come from a variety of sources besides brain activity. One such preferred method is by comparing a point of reference to the data collection point, or "monopolar" detection. The reference point would typically be a skin contact area, but void of localized brain neural activity, such as earlobe clip 122 (shown in FIG. 1). Another such method is "bipolar", which involves comparing data collected from one node or zone, to another. Brain activity is not the only signal which produces voltages detectable at the scalp. These remaining signals are referred to as artifacts which result from most sources of movement in and on the body like the beating of the heart to even the minute movement of the eye.

Electrical activity in the brain has recognizable and associable patterns. After ignoring, or compensating for these artifacts, patterns are discernible and form distinct wave patterns which can be characterized by their amplitude and frequency. Delta, theta, alpha, beta, gamma waves, and more are all examples of distinct patterns one sees in EEG data. For example, delta waves are the highest amplitude seen in the thalamus or cortex and have a frequency range up to 3-4 Hertz (Hz) and share correlations with deep sleep and unconsciousness. Theta waves can range from 4 up to 7 Hz and have been associated with creative activity such as dreaming and imagination states. Alpha frequencies range from 8 Hz to 12 Hz and can represent a relaxed by not necessarily drowsy state. Beta frequencies have several segments, referred to as Beta1, Beta2, Beta3 or as "high," "midrange," and "low" respectively and represent a possible gamut of being relaxed but alert at the lower end, to anxious and obsessive compulsive at the high end (27-32 Hz). Gamma waves typically are around 40 Hz, but can be generally found from 25 Hz up to 100 Hz. These waves have been associated with motor or higher cognitive functions.

TABLE 1

Variables Available and Data Trends
Data Collected by EEG (V/t)

| Characterization | Frequency Range (Hz) | Amplitude Range ($\mu V$) | Head Location | Voluntary Formation | Characteristics Of |
|---|---|---|---|---|---|
| Delta | 0.5-3.5 | 20-200 | Front (adults), rear (children) | Continuous-attention tasks (sometimes) | Deep sleep, unconsciousness |
| | | | | | Irregular and slow wave patterns |
| Theta | 4-7 | 20-100 | General | Idle behavior | More common in children than adults |
| | | | | | Displeasure, pleasure, and drowsiness |
| Alpha | 8-13 | 20-60 | Around the top of head at rest | Sitting quietly while relaxed with eyes closed | Lack of mental activity |
| | | | | | EXC: Arithmetic, archery, golf putting |
| Beta | 14-30 | 2-20 | General, toward front of brain | Being active | Normal thought and activity |
| | | | | Higher Hz levels show anxiety | |

TABLE 1-continued

Variables Available and Data Trends
Data Collected by EEG (V/t)

| Character-ization | Frequency Range (Hz) | Amplitude Range (μV) | Head Location | Voluntary Formation | Characteristics Of |
|---|---|---|---|---|---|
| Gamma | 36-44 | 3-5 | | | Sudden environmental events |

There are no "cut-offs" for what is considered attentive versus not. Generally the higher the mean frequency of activity, the more "active" the mind is being. High focus and agitation is linked to higher frequencies of the beta range (22-30 Hz), but this may be different for everyone. Likely, a device meant to catalogue normal everyday behavior would be limited in data acquisition to the range of 0.5 to 40 Hz, A "minimal acceptable sample rate" was found to be 2.5 times the highest frequency of interest.

Problems noted in trying to associate data of traditional characterizations, such as "delta," "theta," etc., with brain activity, is that the brain's wave responses change depending on factors such as amount of rest. For example, experiments where an increase in theta, with a decrease in alpha and beta mean one thing when the subject is rested, and mean completely the opposite then they are sleep-deprived.

That study did emphasize that for task engagement, correlations in the alpha (8-13 Hz) and high beta/gamma (25-40 Hz) range were indicative of high involvement with a task. In concert with other information, this can be interpreted as lower alpha and higher beta/gamma signals representing higher levels of engagement, and the opposite reflecting less engagement.

Typical EEG sensor placement is made using international 10-20 system (see Reference Numbers 116A-F in FIG. 2, for instance) A1 being the left ear, A2 being the right ear, nasion is the depression between the eyes above the bridge of the nose, and the inion is the bump at the base of the back of the skull.

Using the Communication System Having Automated Filtering Based on Mental State Decisions of the present invention, the waveforms recorded from the electrodes can be processed into several forms, but a "conventional" approach is noted as recording data in regards to time, frequency, and statistic. A common method is using the Welch method of conversion from time to frequency domain followed by fast Fourier transform to populate frequency bins, Data was calculated in one study using fast Fourier transform (FFT) with a Hanning window, $$w(n) = 0.5\left(1 - \cos\left(\frac{2\pi n}{N-1}\right)\right)$$

This data was split into absolute spectral amplitudes in a "full" or 0-32 Hz range, "delta" or 0.4 Hz range, "theta" or 4-8 Hz range, "alpha" or 8-13 Hz range, and "beta" or 13-32 Hz range. The other group was relative spectral amplitudes for alpha through theta, and mean frequencies for the full 0-32 range, alpha, beta, theta, and delta bands. Data based on time domain were not considered as reliable and only spectral frequency data was considered more reliable.

Using the EEG signal measurements from the brain sensors 118 and through analysis of the controller using data from the mental state predictor 146 and mental state database 148, a reliable mental state determination for a user may be made. This determination, as will be described further below, is used to control electronic devices to provide isolation from bothersome interruption during periods of high attentiveness, and to interrupt autonomic replies or responses to unwanted stimulus during periods of anger or frustration.

Figure 3:
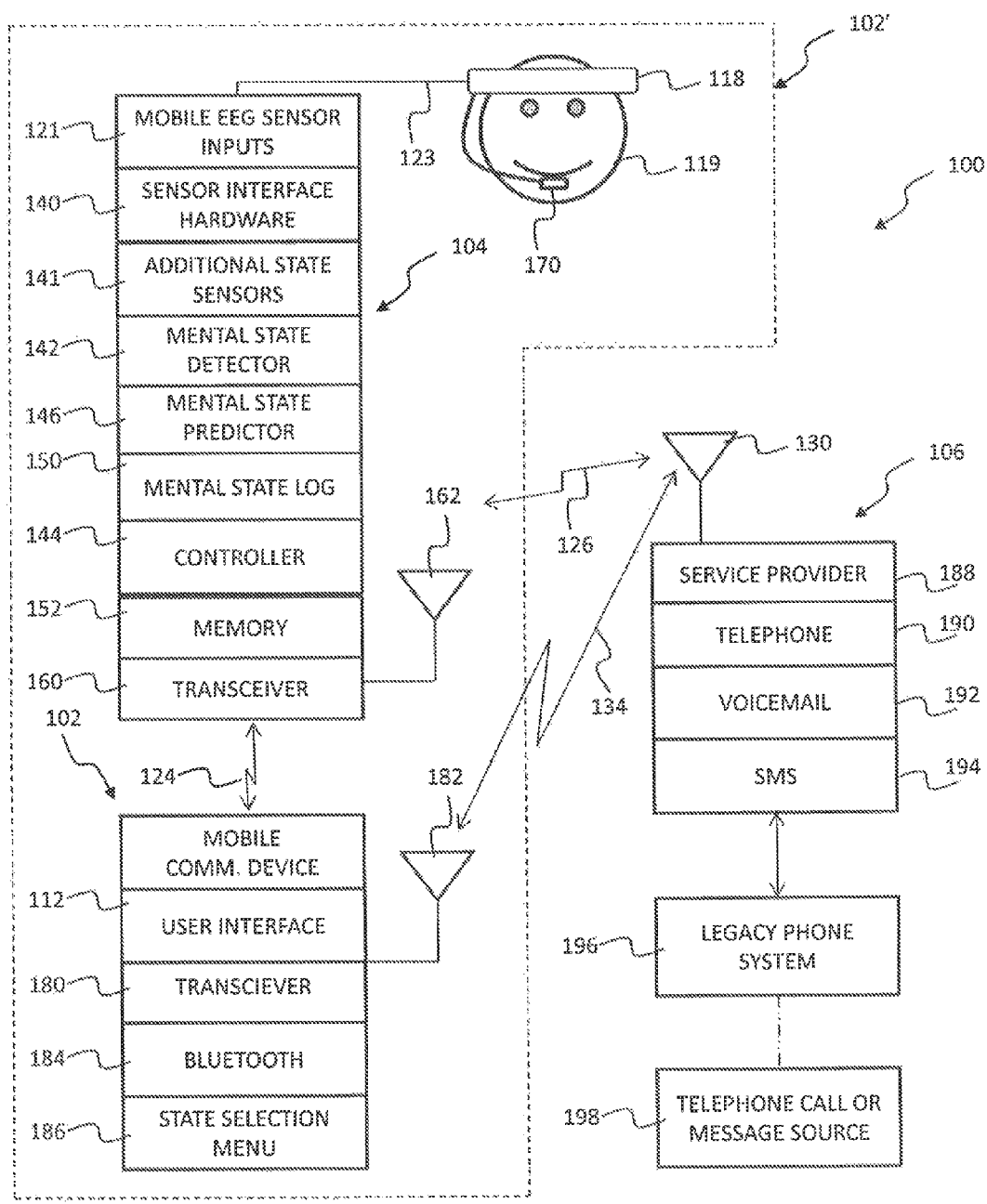
FIG. 3 is a representative block diagram of the Communication System Having Automated Filtering Based on Mental State Decisions of the present invention having a EEG sensor placed on a user and having a microphone, and having the components to condition and conclude the mental state of the user, which is then utilized by a mobile communication device to established a purposeful communication with a communication system, such as a cellular telephone system.

Referring now to FIG. 3, a representative block diagram of the Communication System Having Automated Filtering Based on Mental State Decisions of the present invention is shown and generally designated 100, System 100 includes a brain sensor 118 positioned on a user 119, and having a microphone 170, such as a telephone headset microphone. Signals from brain sensor 118 and microphone 170 are communicated via connection 123 to an EEG sensor input 121 which is in electrical communication with sensor interface hardware 140.

Output from sensor interface hardware 140 is provided to mental state detector 142 which, in combination additional sensor 141 and with mental state predictor 146, determines a mental state or states of the user 119. This mental state is logged in a mental state log database, 150 and provided to controller 144 for storage in memory 152 for later use, and/or provided to transceiver 160 for communication to a communication system 106 via wireless link or through a local wireless link 124 to a mobile electronic device 102, such as through a Bluetooth® transceiver or similar wireless link 184.

Mobile electronic device 102 includes a transceiver 180 used to communicate through antenna 182 to antenna 130 of communication system 106 via communication link 134, and also has a user interface 112, which includes among other things, a state selection menu 186 which is used to provide control inputs to the operation of system 100.

In an alternative embodiment, antenna 162 of transceiver 160 may communication through link 126 directly with communication system 106.

Communication system 106 includes a service provider interface 188 for integration of telephone system 190, voice-mail system 192 and short-messaging service (SMS) system 194. Service provider 188 receives communication data from a legacy phone system 196 which in turn receives communication signals from a telephone call or message source 198 as is known in the art.

Dashed lines surround an alternative combination of components of the system of the present invention. In this configuration, it is to be understood that the device 102' can be incorporated into the same electronic device having both a mobile electronic device 102 and an EEG headset 104 in the same integrated device.

Figure 4:
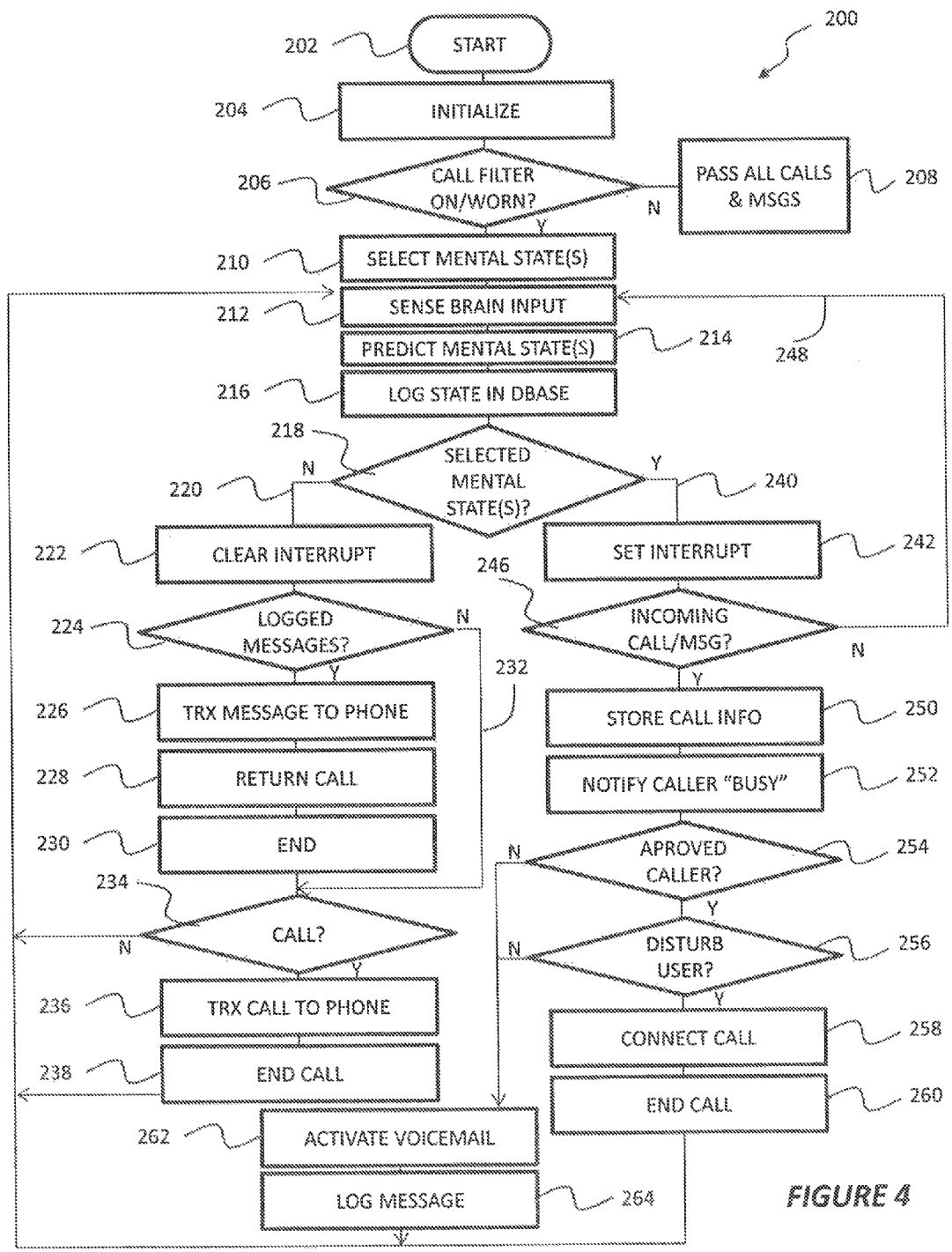
FIG. 4 is an exemplary flow chart outlining the operation of a preferred embodiment of the Communication System Having Automated Filtering Based on Mental State Decisions of the present invention showing the determination of a wearer's mental state, and the operation of the device corresponding to the mental state including the interruption or acceptance of Incoming calls, providing notification to the caller that the user is "busy", passing the caller to voicemail, or in conditions when the mental state of the wearer is appropriate, the call or logged messages will be transferred to the user.

The operation of the Communication System Having Automated Filtering Based on Mental State Decisions is depicted in FIG. 4 which includes an exemplary flow chart outlining the operation of a preferred embodiment of the device, and is generally designated 200.

Method 200 begins in step 202 with an initialization of the system 204. During the initialization step, the electronics are calibrated, and the controller and/or microprocessors and memory are initialized. Once initialized, a user input is received in step 206 to determine if the call filtering function of the present invention is "ON", or automatically detected if the brain sensor is being worn. If the filtering function is "OFF", or the device is not worn, all incoming calls and messages are passed through to the communication device in step 208.

If the filtering function is "ON", the user may select the mental state to be used for the filter function in step 210. Specifically, step 210 includes the selection of many different states as outlined above in conjunction with FIG. 2, and Table 1. Next, brain input is sensed in step 212 and from those input signals, a mental state is predicted in step 214. The mental state prediction in step 214 is then logged in a mental state database in step 216.

In the next step 218, device 100 monitors the mental state of the user. For instance, if the selected mental state from step 210 was "focused", then the selected mental state will be focused when evaluating step 218. It is to be appreciated that step 218 may consider one or more, or combinations, of mental states for evaluation.

If the targeted or selected mental state is not sensed, such as the user is not in the "focused" state, the method progresses along path 220 to step 222 where the call interruption flag is cleared thus allowing ordinary operation of the mobile electronic device 102. In step 224, method 200 determines if there are previously logged messages which were previously prevented from delivery. If no messages exist, method 200 advances along path 232 to step 234. However, if messages do exist, the messages are transferred to the mobile device in step 226, or the calls are returned in step 228 until the calls end in step 230 and the method 200 advances to step 234.

Step 234 determines if a call is received. If no call is received, the method 200 returns to sense the brain input in step 212. However, if a call is received in step 234, the call is transferred to the phone in step 236 until ended in step 238 and the method returns to sense the brain input in step 212.

Returning to step 218, if the mental state of the user is the same as the mental state selected in step 210, a call interrupt flag is set in step 242. However, if no calls are received in step 246, method 200 returns to sense brain input 212 along path 248. On the other hand, when an incoming call exists, the call data is logged in step 250, and the caller is notified that the recipient is "busy". Additionally, the caller could be notified by the system that they may leave a message, or the caller may request an automatic call-back once the recipient is no longer busy. In circumstances where the caller is also equipped with the Communication System Having Automated Filtering Based on Mental State Decisions of the present invention, the system can automatically connect the caller and user when both are in the correct state. Or, the system could confirm with the caller if he still desires to connect with the user, and then complete the call with the caller.

In the event the caller is an "approved caller", such as a parent, child, colleague, etc. as determined in step 254, the caller may be prompted whether they wish to disturb the caller despite the "busy" condition in step 256. If so, the call is connected in step 258 until it ends in step 260, and the system returns to step 212 to sense brain input.

If either the caller is not approved as determined in step 254, or chooses not to disturb the caller in step 256, the caller is routed to voicemail in step 262, and the message is logged in step 264 for later retrieval as set forth in conjunction with step 224 and 226. Once the voicemail and logging is complete, the system returns to sense brain input in step 212 where the process 200 continues during the operation of the device.

Figure 5:
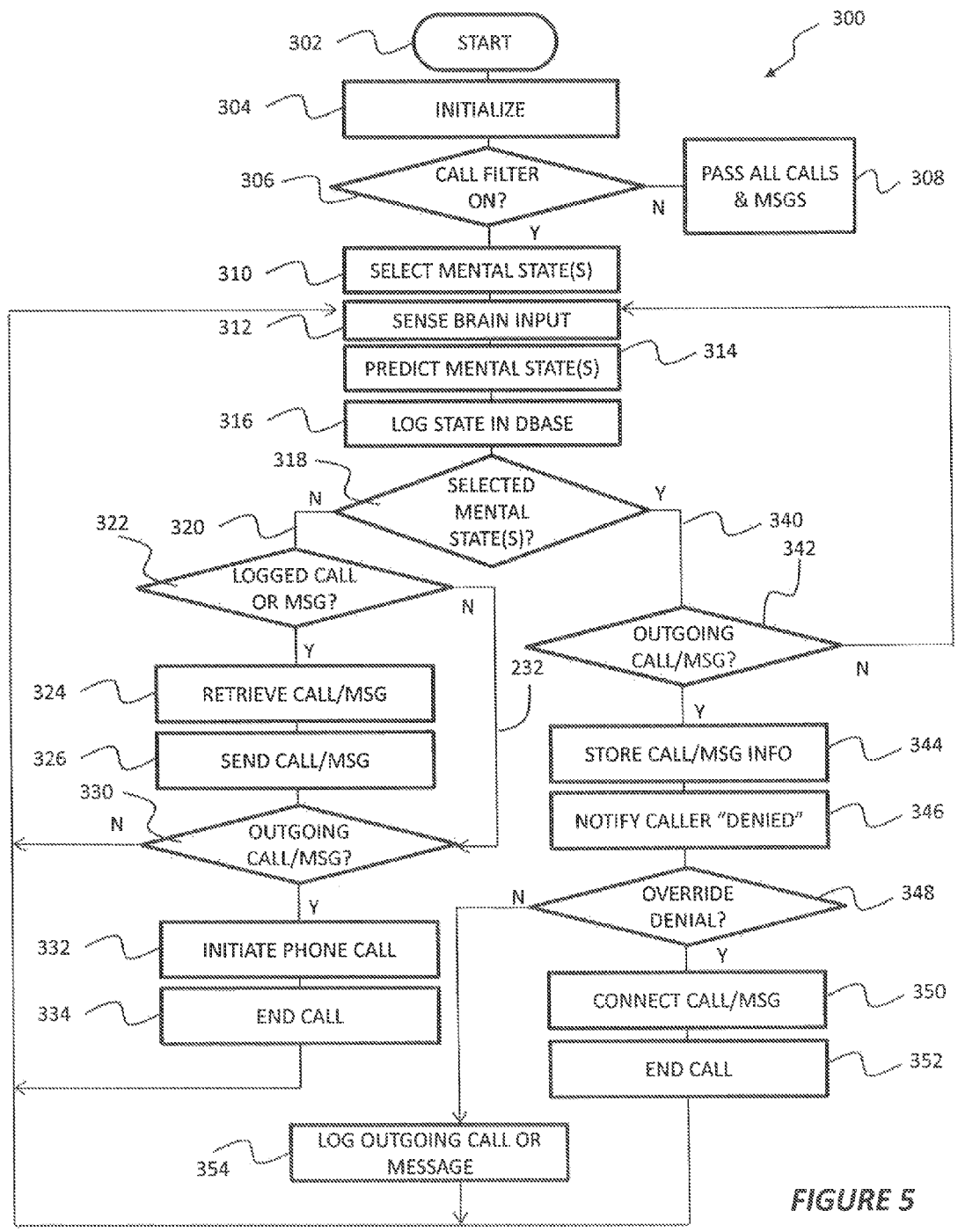
FIG. 5 is an exemplary flow chart outlining the operation of a preferred embodiment of the Communication System Having Automated Filtering Based on Mental State Decisions of the present invention showing the determination of a wearers mental state, and the operation of the device corresponding to the mental state including the interruption of outgoing calls or messages.

Referring now to FIG. 5, an exemplary flow chart outlining the operation of a preferred embodiment of the Communication System Having Automated Filtering Based on Mental State Decisions of the present invention is shown and generally designated 300. Method 300 provides control of outgoing messages or phone calls based on mental state criteria. Method 300 begins in step 302 with an initialization of the system 304. During the initialization step, the electronics are calibrated, and the controller and/or microprocessors and memory are initialized, Once initialized, a user input is received in step 306 to determine if the call filtering function of the present invention is "ON", or automatically detected if the brain sensor is being worn, If the filtering function is "OFF", or the device is not worn, all incoming calls and messages are passed through to the communication device in step 308.

If the filtering function is "ON", the user may select the mental state to be used for the filter function in step 310. Specifically, step 310 includes the selection of many different states as outlined above in conjunction with FIG. 2, and Table 1. Next, brain input is sensed in step 312 and from those input signals, a mental state is predicted in step 314. The mental state prediction in step 314 is then logged in a mental state database in step 316.

In the next step 318, device 100 monitors the mental state of the user. For instance, if the selected mental state from step 310 was "angry", then the selected mental state will be angry when evaluating step 318. It is to be appreciated that step 318 may consider one or more, or combinations, of mental states for evaluation.

If the user's mental state is not the same as the selected mental state as determined n step 318, path 320 leads method 300 to logged call or messages which may exist in step 322. If no calls or logged messages exist, method 300 advances along path 332 to step 330. If logged messages or calls exist, they are retrieved in step 324, and the user can send logged calls or messages in step 326. If the user wishes to send a new message or make a call in step 330, the call is initiated in step 332 until the call ends in step 334.

If the mental state of user is the same as the selected mental state as determined in step 318, method 300 advances along path 340 to step 342 where user may attempt to send a message or make a call. If no calls or message are sought, method 300 returns to sense brain input in step 312. If a new call or message is sought, the call or message information is stored in step 344 and the caller is notified that the call or message has been denied in step 346.

If the user does not agree with the denial of service, the user may override the denial in step 348 which allows the call to connect or the message to be sent in step 350 until the call ends in step 352. If the user does not override the denial in step 348, the outgoing call or message is logged in step 354 and the method returns to sense brain input in step 312.

This aspect of the Communication System Having Automated Filtering Based on Mental State Decisions of the present invention provides a user with a period of time to reflect on the appropriateness of the call or message being sent, and allows the system to prevent the transmission of an otherwise troublesome message.

Figure 6:
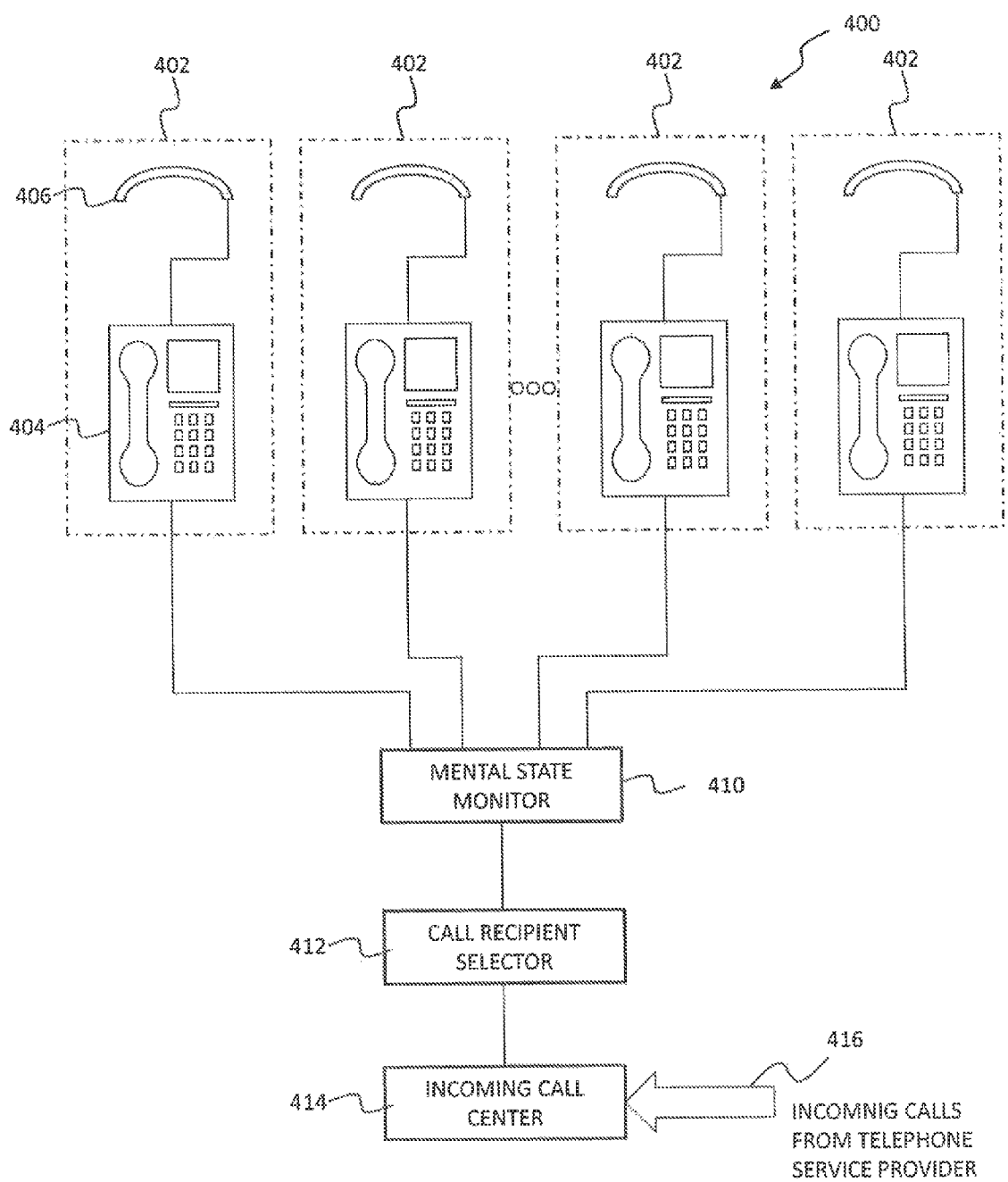
FIG. 6 is a representative block diagram of the Communication System Having Automated Filtering Based on Mental State Decisions as embodied in a call center having a number of users on multiple telephone device, each in communication with a mental state monitor and a call recipient selector which receives calls from an incoming call center and then assigns the calls to the users depending on their specific measured mental state.

FIG. 6 is a representative block diagram of the Communication System Having Automated Filtering Based on Mental State Decisions as embodied in a call center is generally designated 400. Call center 400 includes a number of users 402 on multiple telephone devices 404, each in communication with a mental state monitor 406. A mental state monitor 410 receives mental state data from mental state monitor 406 and provides input to a call recipient selector 412 which receives calls from an incoming call center 414.

By using the mental state of the call center personnel, and the call-specific data regarding the type and/or nature of the call, the call recipient selector 412 then assigns the calls to the users depending on their specific measured mental state. For instance, when a call handler becomes stressed or agitated, the call recipient selector may use the mental state data to direct a less confrontational call to the call handler. Similarly, once the call handler becomes calm as determined by the mental state monitor 410, a more aggressive call handling schedule may be resumed.

The present invention also reduces the negative distraction quality of always being connected by controlling the device with mental states. In addition, this invention allows controlling other devices based on mental states. For instance, if the present invention is embodied in a musical media player, the user's mental state can be used to select different music play lists based on mental state. For instance, the user may have a set of music to keep the focus states and other to keep a more relaxed state. Indeed, the system monitors the effects of certain music on the users mental states, and learns which music is more soothing to the users mind, without any user intervention. Similarly, the present invention could change the TV channel without user intervention: when the user is bored the system detects a mental change and switches the channel. For example, ads are causing the user to get bored and the system switches to channel surfing until the original show is back from ads and the TV automatically detects it.

While there have been shown what are presently considered to be preferred embodiments of the present invention, it will be apparent to those skilled in the art that various changes and modifications can be made herein without departing from the scope and spirit of the invention.

I claim:

1. A communication device for automated filtering based on mental state decisions, comprising:
   a brainwave sensing device, positioned on a user and having at least one sensor;
   a signal conditioner, having a sensor interface hardware, a state detector, a controller, a mental state predictor, a mental state database, a mental state log database, a memory and a transceiver;
   wherein said at least one sensor of said brainwave sensing device has a signal that passes through said signal conditioner;
   wherein said transceiver of said signal conditioner communicates said signal to a portable electronic device;
   wherein said portable electronic device further communicates with a telecommunication system over a channel; and
   wherein said channel can be interrupted or allowed to said portable electronic device based on said signal.

2. The communication device in claim 1, wherein said brainwave sensing device is a electroencephalograph (EEG) headset having at least one EEG sensor capable of perceiving the electrical characteristics of a brain within a skull.

3. The brainwave sensing device in claim 1, further comprising a microphone.

4. The brainwave sensing device of claim 3, wherein said microphone is a telephone headset microphone.

5. The signal conditioner in claim 1, further comprising at least one additional state sensor 6. The signal conditioner in claim 1, further comprising a EEG sensor input in electrical communication with said sensor interface hardware.

7. A method for operating a communication system for automated filtering based on mental state decisions, comprising:
   initializing said system, including calibrating one or more electronics, and initializing a controller and a memory;
   determining if a call filtering function is "ON", wherein if said filtering function is "OFF", all incoming calls and messages are passed through to a communication device and wherein if said filtering function is "ON", a user may select a target mental state to be used for a filter function sensing one or more brain input signal;
   predicting a mental state prediction from said one or more brain input signal;
   logging said mental state prediction into in a mental state database; and
   monitoring said mental state of said user, wherein if said target mental state is not sensed a call interruption flag is cleared, allowing ordinary operation of a portable electronic device and wherein if said target mental state is sensed a call interrupt flag is set.

8. The method for operating a communication system for automated filtering based on mental state decisions in claim 7, wherein initializing said system further comprises initializing at least one microprocessor.

9. The method for operating a communication system for automated filtering based on mental state decisions in claim 7, wherein monitoring said mental state of said user considers one or more, or combinations, of mental states for an evaluation.

10. The method for operating a communication system for automated filtering based on mental state decisions in claim 7, wherein monitoring said mental state of said user and said target mental state is not sensed a call interruption flag is cleared, further comprising:
    determining if one or more previously logged messages exist which were previously prevented from delivery, wherein if said one or more messages do not exist, calling voicemail, and wherein if said one or more messages do exist, transferring said one or more messages to said portable electronic device; and
    determining if a call is received, wherein if said call is not received, the brain input is sensed; and wherein if said call is received said call is transferred to said phone.

* * * * *